US011847053B2

(12) United States Patent
Kallurkar et al.

(10) Patent No.: US 11,847,053 B2
(45) Date of Patent: Dec. 19, 2023

(54) APPARATUSES, METHODS, AND SYSTEMS FOR A DUPLICATION RESISTANT ON-DIE IRREGULAR DATA PREFETCHER

(71) Applicant: INTEL CORPORATION, Santa Clara, CA (US)

(72) Inventors: Prathmesh Kallurkar, Bangalore (IN); Anant Vithal Nori, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/833,419

(22) Filed: Mar. 27, 2020

(65) Prior Publication Data

US 2021/0303468 A1    Sep. 30, 2021

(51) Int. Cl.
| | | |
|---|---|---|
| *G06F 12/08* | (2016.01) | |
| *G06F 12/12* | (2016.01) | |
| *G06F 11/30* | (2006.01) | |
| *G06F 9/30* | (2018.01) | |

(Continued)

(52) U.S. Cl.
CPC ...... *G06F 12/0811* (2013.01); *G06F 9/30047* (2013.01); *G06F 11/3037* (2013.01); *G06F 12/123* (2013.01); *G06F 2212/1021* (2013.01)

(58) Field of Classification Search
CPC ............. G06F 12/0811; G06F 11/3037; G06F 12/123; G06F 9/30047; G06F 2212/1021
See application file for complete search history.

(56) References Cited

U.S. PATENT DOCUMENTS

| | | | | |
|---|---|---|---|---|
| 6,397,298 | B1* | 5/2002 | Arimilli | G06F 12/121 |
| | | | | 711/E12.07 |
| 2016/0335177 | A1* | 11/2016 | Huang | G06F 12/0864 |
| 2018/0137053 | A1* | 5/2018 | Kryukov | G06F 12/0891 |

(Continued)

OTHER PUBLICATIONS

Bakhshalipour et al., "Domino Temporal Data Prefetcher", Appears in Proceedings of the 24th International Symposium on High-Performance Computer Architecture (HPCA), IEEE, 2018, 12 Pages.

(Continued)

*Primary Examiner* — Masud K Khan
(74) *Attorney, Agent, or Firm* — NICHOLSON DE VOS WEBSTER & ELLIOTT LLP

(57) ABSTRACT

Systems, methods, and apparatuses relating to circuitry to implement a duplication resistant on-die irregular data prefetcher are described. In one embodiment, a hardware processor includes a cache to store a plurality of cache lines of data, a processing element to execute instructions to generate memory requests, and a prefetch circuit to track a first set of cache lines, requested to be accessed by the memory requests, that repeat in a first number of executed instructions, track a second set of cache lines, requested to be accessed by the memory requests, that repeat in a second, larger number of executed instructions, detect a memory request from an instruction for a cache line from the cache, determine if the cache line is within the first set of cache lines or the second set of cache lines, update first correlation data for the cache line when the cache line is within the first set of cache lines, and update second correlation data for the cache line when the cache line is within the second set of cache lines.

24 Claims, 18 Drawing Sheets

(51) Int. Cl.
    *G06F 12/0811*    (2016.01)
    *G06F 12/123*     (2016.01)

(56) References Cited

U.S. PATENT DOCUMENTS

2021/0042230 A1*   2/2021   Gupta ................. G06F 12/0826
2021/0089456 A1    3/2021   Bera et al.

OTHER PUBLICATIONS

Kim et al., "Path Confidence Based Lookahead Prefetching", IEEE, 2016, 12 pages.
Viswanathan et al., "Intel (registered) Memory Latency Checker V3.9", Intel, Available Online at <https://software.intel.com/content/www/us/en/develop/articles/intelr-memory-latency-checker.html>, Nov. 22, 2013, 10 pages.
Wu et al., "Efficient Metadata Management for Irregular Data Prefetching", ACM International Symposium on Computer Architecture, Jun. 22-26, 2019, 13 pages.
Wu et al., "SHIP: Signature-based Hit Predictor for High Performance Caching", ACM, MICRO '11, Dec. 3-7, 2011, 12 pages.

\* cited by examiner

1000

```
┌─────────────────────────────────────────────────────────────────────┐
│ TRACKING A FIRST SET OF CACHE LINES, REQUESTED TO BE ACCESSED BY     │
│ MEMORY REQUESTS GENERATED FROM EXECUTION OF INSTRUCTIONS BY A        │
│ HARDWARE PROCESSOR, THAT REPEAT IN A FIRST NUMBER OF EXECUTED        │
│ INSTRUCTIONS WITH A PREFETCH CIRCUIT OF A SYSTEM COMPRISING THE      │
│ HARDWARE PROCESSOR                                                   │
│ 1002                                                                 │
└─────────────────────────────────────────────────────────────────────┘
                                    │
                                    ▼
┌─────────────────────────────────────────────────────────────────────┐
│ TRACKING A SECOND SET OF CACHE LINES, REQUESTED TO BE ACCESSED BY    │
│ THE MEMORY REQUESTS, THAT REPEAT IN A SECOND, LARGER NUMBER OF       │
│ EXECUTED INSTRUCTIONS WITH THE PREFETCH CIRCUIT 1004                 │
└─────────────────────────────────────────────────────────────────────┘
                                    │
                                    ▼
┌─────────────────────────────────────────────────────────────────────┐
│ DETECTING A MEMORY REQUEST FROM AN INSTRUCTION FOR A CACHE LINE      │
│ FROM A CACHE OF THE HARDWARE PROCESSOR BY THE PREFETCH CIRCUIT 1006  │
└─────────────────────────────────────────────────────────────────────┘
                                    │
                                    ▼
┌─────────────────────────────────────────────────────────────────────┐
│ DETERMINING IF THE CACHE LINE IS WITHIN THE FIRST SET OF CACHE LINES │
│ OR THE SECOND SET OF CACHE LINES BY THE PREFETCH CIRCUIT 1008        │
└─────────────────────────────────────────────────────────────────────┘
                                    │
                                    ▼
┌─────────────────────────────────────────────────────────────────────┐
│ UPDATING FIRST CORRELATION DATA FOR THE CACHE LINE WHEN THE CACHE    │
│ LINE IS WITHIN THE FIRST SET OF CACHE LINES BY THE PREFETCH CIRCUIT  │
│ 1010                                                                 │
└─────────────────────────────────────────────────────────────────────┘
                                    │
                                    ▼
┌─────────────────────────────────────────────────────────────────────┐
│ UPDATING SECOND CORRELATION DATA FOR THE CACHE LINE WHEN THE CACHE   │
│ LINE IS WITHIN THE SECOND SET OF CACHE LINES BY THE PREFETCH CIRCUIT │
│ 1012                                                                 │
└─────────────────────────────────────────────────────────────────────┘
```

FIG. 10

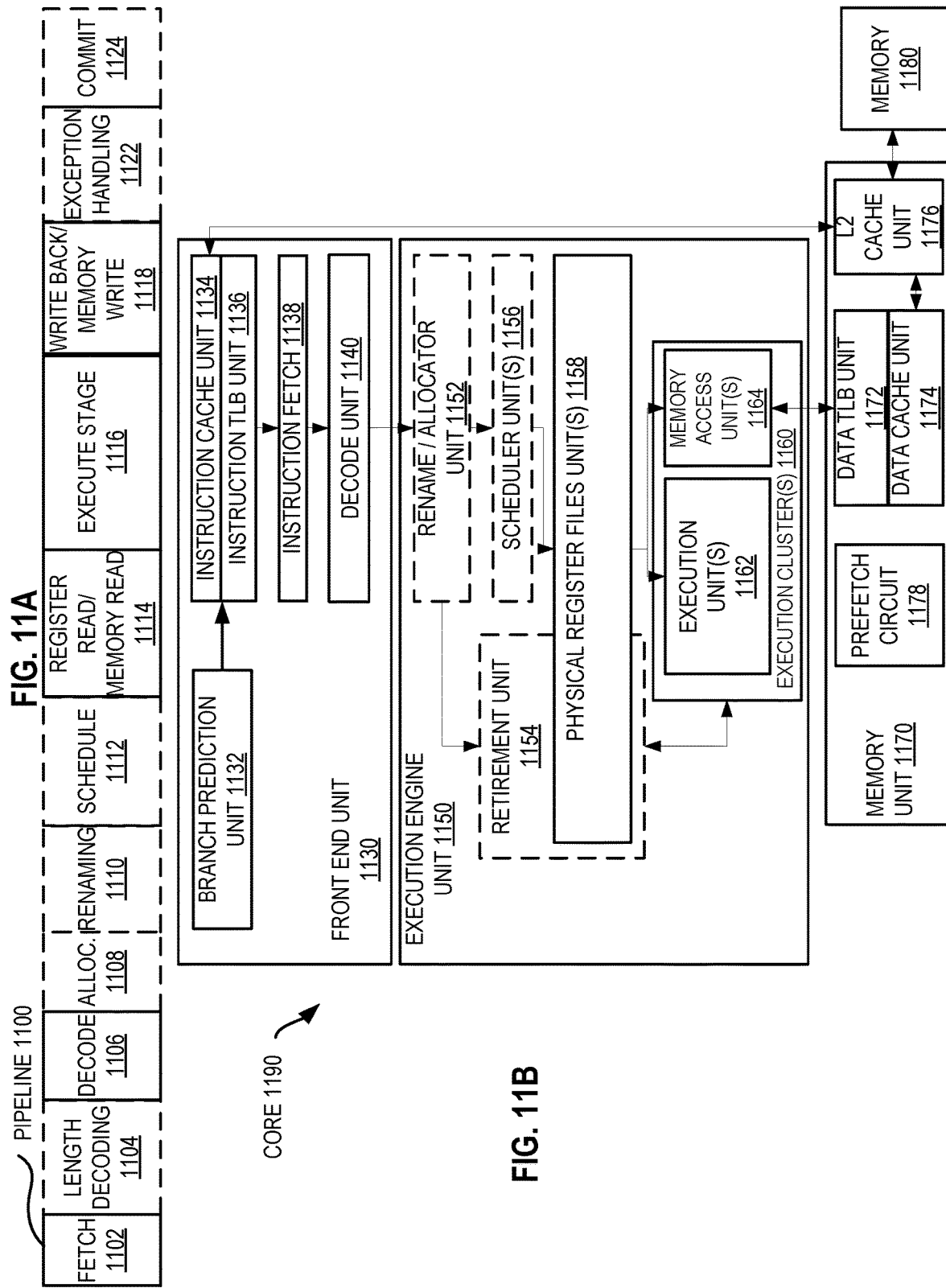

US 11,847,053 B2

APPARATUSES, METHODS, AND SYSTEMS FOR A DUPLICATION RESISTANT ON-DIE IRREGULAR DATA PREFETCHER

TECHNICAL FIELD

The disclosure relates generally to electronics, and, more specifically, an embodiment of the disclosure relates to circuitry to implement a temporal data prefetcher that stores its information in the last level cache of a processor.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 10 illustrates a method of updating first correlation data and second correlation according to embodiments of the disclosure.

FIG. 11A is a block diagram illustrating both an exemplary in-order pipeline and an exemplary register renaming, out-of-order issue/execution pipeline according to embodiments of the disclosure.

FIG. 11B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
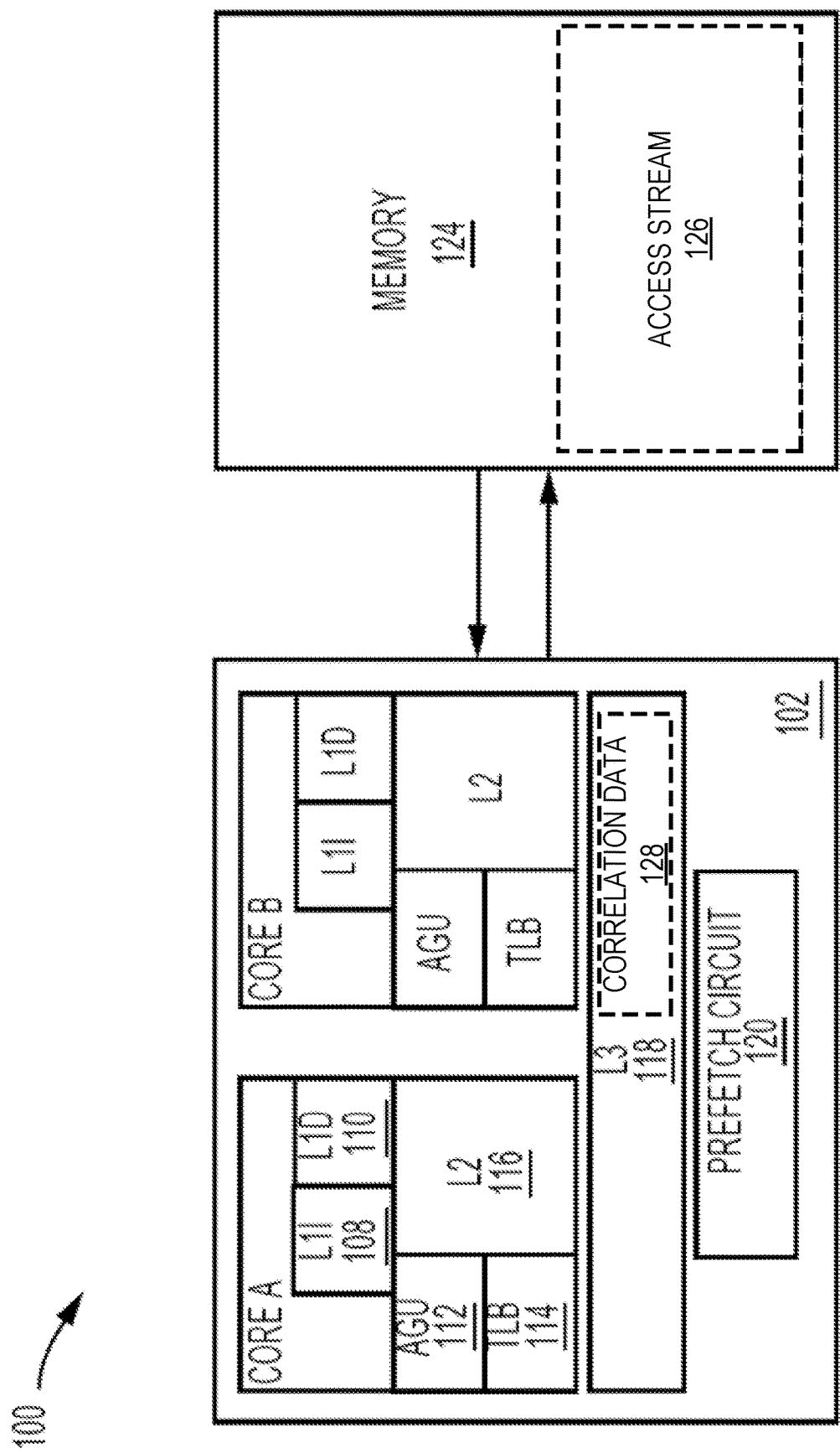
FIG. 1 illustrates a block diagram of a multiple core hardware processor with a prefetch circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor may operate on a cache line, e.g., in performing arithmetic or logic functions. A cache line may generally refer to a block (e.g., a sector) of memory (e.g., a cache) that may be managed as a unit for coherence purposes, for example, via cache tags maintained on a per-line basis, e.g., in a tag directory of a cache controller circuit. A cache line may be stored in cache memory (e.g., of any level, such as, but not limited to, L1, L2, L3, L4, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and other memory, for example, to store (e.g., hold) currently active copies of cache lines (for example, blocks from system (e.g., main) memory). Cache memory may be local to each processor. Additionally, or alternatively, cache memory may be shared by multiple processors, e.g., separate from each processor. System memory may be separate from any cache memory, e.g., system memory that is off-die relative to a processor core. Processing elements that use (e.g., share) a cache may be processor cores of a data processor and/or graphic processors. Cache line may refer to a 64-byte sized section of memory, e.g., 64 byte granularity.

A processor may use a prefetcher (e.g., prefetch circuit) to prefetch data, for example, to predict access addresses and bring the data for those addresses into a cache or caches (e.g., from memory, such as, but not limited to dynamic random access memory (DRAM)).

In certain embodiments, accessing memory remains a primary bottleneck to performance in a processor. Prefetching of data is a key technique to solve this problem. However, there are numerous irregular workloads that exhibit temporal access patterns (e.g., data-dependent) that cannot be captured by a spatial prefetcher. Temporal prefetching is a key technique to prefetch data for such access streams. In one embodiment, a temporal prefetcher memorizes an entire cache miss streams and stores it in dedicated regions of the (e.g., main) memory (e.g., access stream 126 in FIG. 1). However, accesses to memory off chip (e.g., off die) degrades the performance of such a prefetcher.

Embodiments herein are directed to an optimized temporal data prefetcher that does not require software changes and delivers significant performance gains with the hardware disclosed herein.

In certain embodiments, a temporal prefetcher memorizes an entire cache miss address streams with the expectation that these streams might repeat, e.g., with a cache miss (e.g., a requested cache line not being present in a cache) beings a trigger to lookup the previously memorized address stream and prefetch addresses within them.

In one embodiment, a prefetcher memorizes cache access streams by storing the addresses of all (e.g., interesting) cache accesses (e.g., prefetch hits and cache misses) in a history buffer structure (e.g., hardware unit), e.g., and using an index table structure (e.g., hardware unit) to efficiently locate an address' most recent occurrence in the history buffer structure. On a cache miss, the prefetcher may read the index table to find the subsequent miss stream's pointer in the history buffer, read addresses belonging to the predicted subsequent accesses, and issue prefetches for them.

In one embodiment, a prefetcher correlates accesses emanating out of each instruction. For example, with the prefetcher memorizing the access stream of an instruction by enumerating accesses, and the enumerated value for a physical address being called its structural address. The prefetcher may store mapping from its physical to structural address and structural to physical address in two separate tables (e.g., that are stored off-chip) and may store the more frequently used mappings in dedicated on-chip caches.

Certain embodiments of a prefetcher disclosed herein do not store redundant information (e.g., do not store redundant information in their correlation data). Certain embodiments of a prefetcher disclosed herein do not store the same mapping of physical addresses to structural addresses in two separate tables. Certain embodiments of a prefetcher disclosed herein do not store the same access stream multiple times (e.g., in a history buffer). Certain embodiments of a prefetcher disclosed herein are not agnostic to the frequency of a temporal stream. Certain embodiments of a prefetcher disclosed herein do not (e.g., frequently) access the memory (e.g., DRAM) to maintain their correlation data (e.g., metadata), for example, to avoid a read latency to access the memory (e.g., for DRAM may be about 100 processor cycles per access) that directly impacts the timeliness of its prefetches and/or avoid increasing the loaded-latency of other accesses (e.g., load/stores/prefetches) arbitrating for the memory. Certain embodiments of a prefetcher disclosed herein store correlation data (e.g., metadata) inside a proper subset of a cache (e.g., LLC) of a processor, for example, using the temporally localized stream format discussed herein).

Certain embodiments of a prefetcher disclosed herein stores its entire correlation data (e.g.., correlation metadata) on-chip. Certain embodiments of a prefetcher disclosed herein correlate cache (e.g., L2) accesses by grouping temporally localized (e.g., L2) accesses that have similar reuse distances, e.g., to allow the identification of more frequently used correlation data (e.g., metadata) entries. Certain embodiments of a prefetcher disclosed herein de-duplicate the correlation data, e.g., to deliver significant performance gains while consuming less storage. In one embodiment, this restricted metadata store fits inside a small portion of an LLC of a hardware processor. Certain embodiments of a prefetcher disclosed herein identify and use (e.g., seemingly irregular) accesses that are spatially correlated over large temporal windows of instruction execution (e.g., 10 million, 100 million, 150 million, 250 millions, or any other number of instructions being executed in that temporal window). Certain embodiments of a prefetcher disclosed herein do not make any changes to the software stack.

FIG. 1 illustrates a block diagram 100 of a multiple core hardware processor 102 with a prefetch circuit 120 according to embodiments of the disclosure. Any processor may include a prefetch circuit, e.g., the processors discussed below. FIG. 1 illustrates an embodiment of multiple processor cores (core A and core B) and multiple levels of caches (L1, L2, and L3), e.g., in a cache coherency hierarchy. Although two cores are depicted, a single or more than two cores may be utilized. Although multiple levels of cache are depicted, a single, or any number of caches may be utilized. Cache(s) may be organized in any fashion, for example, as a physically or logically centralized or distributed cache.

In an embodiment, a processor, such as a processor or processors including the processor cores illustrated in the Figures, or any other processor, may include one or more caches. FIG. 1 illustrates an embodiment of a three level (e.g., levels 1 (L1), 2 (L2), and 3 (L3)/last level cache (LLC)) cache hierarchy. In one embodiment, multiple cores (core A and B) are of a single processor 102. A core (e.g., core A and core B) may include the components of a processor to execute instructions. An un-core may include all logic not in a core. A processor core (e.g., core A) may include components such as a level 1 instruction cache (L1I) 108 and a level 1 data cache (L1D) 110. A core (e.g., core A) may include components such as an address generation unit (AGU) 112, translation lookaside buffer (TLB) 114, and a level 1 cache (L2) 116. A core may or may not share a cache with other cores, e.g., core A and core B may share the level 3 cache (L3) 118 but not the L2 116 or L1 (108,110). A core may include any combination of these components or none of these components. Processor 102 (e.g., core A and core B) may access (e.g., load and store) data in the system memory 124, e.g., as indicated by the arrows. In one embodiment, the system memory 124 communicates with the core over a bus, e.g., at a slower access and/or cycle time than the core accessing cache (e.g. cache on the processor 102). System memory 124 may include an access stream 126 (e.g., a stream of addresses of each cache line miss in a cache(s)).

An address generation unit (e.g., AGU 112), for example, address computation unit (ACU), may refer to a circuit inside a processor (e.g., a core) that calculates addresses used to access memory (e.g., system memory 124), for example, to allow the core to access the system memory. In one embodiment, the AGU takes data values (e.g. register value and addresses mentioned in an instruction) as an input and outputs the (e.g., virtual) addresses for that stream. A core may include an execution circuit (e.g., execution unit) to perform arithmetic operations, such as addition, subtraction, modulo operations, or bit shifts, for example, utilizing an adder, multiplier, shifter, rotator, etc. thereof.

A translation lookaside buffer (e.g., TLB 114) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

Prefetch circuit 120 may be a separate functional circuit (e.g., unit), for example, not utilizing the functional units (e.g., execution unit, Arithmetic Logic Unit (ALU), AGU, TLB, etc.) of a core. Prefetch circuit may be utilized by a prefetch instruction. Prefetch circuit may include circuitry (e.g., hardware logic circuitry) to perform the prefetching discussed herein. Prefetch circuit may be part of a processor (e.g., separate from a core(s)). Prefetch circuit may communicate with the core(s) of the processor, e.g., via communication resources, such as, but not limited to, a ring network. Processor 102 may communicate with the system memory 124 and/or caches (e.g., L1, L2, or L3 in FIG. 1) via a memory controller (e.g., as part of the processor) and/or an interconnect. Prefetch circuit 120 may output the system memory addresses to a memory controller (e.g., memory unit 1170 in FIG. 11B) of processor 102. Correlation data (e.g., metadata) 128 may be stored into a cache (e.g., L3/LLC cache 118) for example, after being generated as discussed herein.

Figure 2:
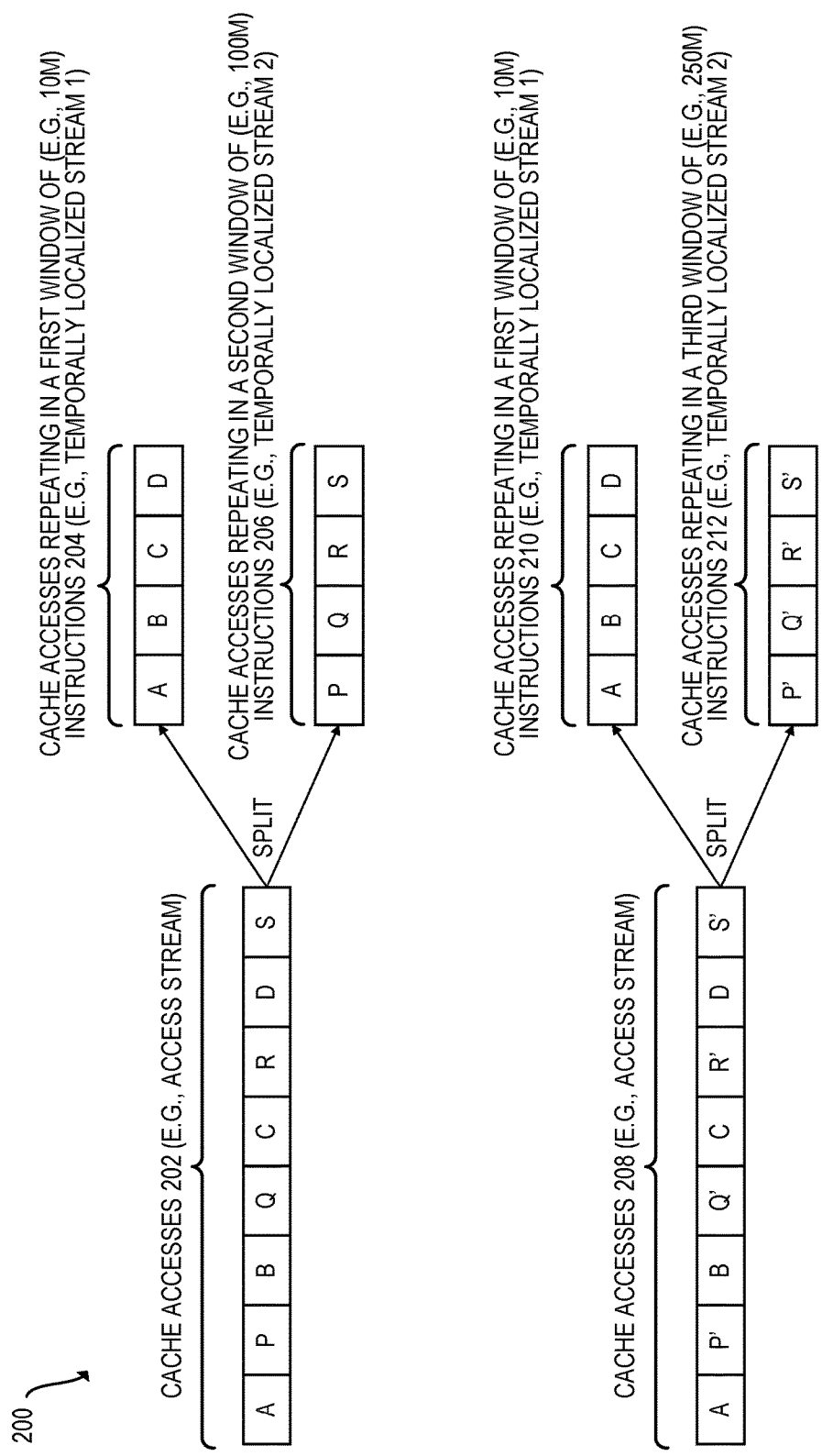
FIG. 2 illustrates an example flow for creating a plurality of temporally localized streams from an access stream according to embodiments of the disclosure.

FIG. 2 illustrates an example flow 200 for creating a plurality of temporally localized streams (206, 206 and 210,212) from an access stream (202, 208, respectively) according to embodiments of the disclosure. In one embodiment, each access stream (202, 208) indicates (e.g., L2) cache accesses (e.g., hits and/or misses).

Consider two accesses A and B, for example, where A is a request for a first cache line and B is a request for a second cache line (e.g., with A being the physical address of the first cache line and B being the physical address of the second cache line. In certain embodiments, an A to B temporal correlation exists if A is followed by B. In one embodiment, this requires the exact pattern of B immediately following A. However, certain embodiments herein take a different approach by assuming that if an A to B temporal correlation exists in program flow, then A and B will have the same reuse distance. Thus, a prefetcher may track a few reuse distance windows (e.g., buckets) and track correlations between accesses falling in the same reuse window (e.g., bucket). The call access streams in the same reuse window (e.g., bucket) may be referred to as a temporally localized streams.

For example, access stream 202 may thus be split into a cache accesses repeating in a first temporal window 204 (e.g., number of executed instructions) (e.g., 10M instructions) to form a first temporally localized stream and a second temporal window 206 (e.g., number of executed instructions) (e.g., 100M instructions) to form a second temporally localized stream.

For example, access stream 208 may thus be split into a cache accesses repeating in a first temporal window 210 (e.g., number of executed instructions) (e.g., 10M instructions) to form a first temporally localized stream and a second temporal window 212 (e.g., number of executed instructions) (e.g., 250M instructions) to form a second temporally localized stream. The size of each temporal window (e.g., number of executed instructions) may be selected, e.g., by a prefetcher. In one embodiment, circuitry (e.g., a prefetch circuit) includes a hardware bloom filter(s) to approximate two important properties of a mathematical set: (1) insert an element into the set, and (2) determine whether an element is present in the set or not. A hardware bloom filter may thus track the temporal streams in multiple reuse windows (e.g., buckets), e.g., with a set of accesses belonging to a single reuse window being maintained using a single bloom filter. In one embodiment, if a prefetcher is to check (e.g., track) if an access belongs to a reuse window (e.g., bucket) of a first width (e.g., 10M) or a second width (e.g., 100M), it checks if the access' address is present in the respective bloom filters for the first width (e.g., 10M) and the second width (e.g., 100M) of instruction execution. As discussed further herein, the prefetcher may use this information to enqueue the access (e.g., in a corresponding recent access queue (RAQ) and/or corresponding correlation data) of one of a plurality of temporal streams, for example, a first temporally localized stream for accesses repeating in a first window (e.g., 10M) of instruction execution, a second temporally localized stream for accesses repeating in a second window (e.g.,100M) of instruction execution, and/or (3) accesses not encountered in the second window (e.g., in the last 100M) of instruction execution.

Note the letters A, B, C, etc. herein are merely examples. As discussed herein, the letters may be an indicator of a cache line (e.g., its address, such as, but not limited to, its physical address) or the actual address itself.

As shown using the above-mentioned example access streams, clustering accesses based on recency information helps certain embodiments herein create accurate temporal correlations, and also to identify the more frequently used temporal correlations. For example, embodiments herein may use temporal windows to determine temporal correlation for a subset of accesses instead of keeping track of all accesses.

Figure 3:
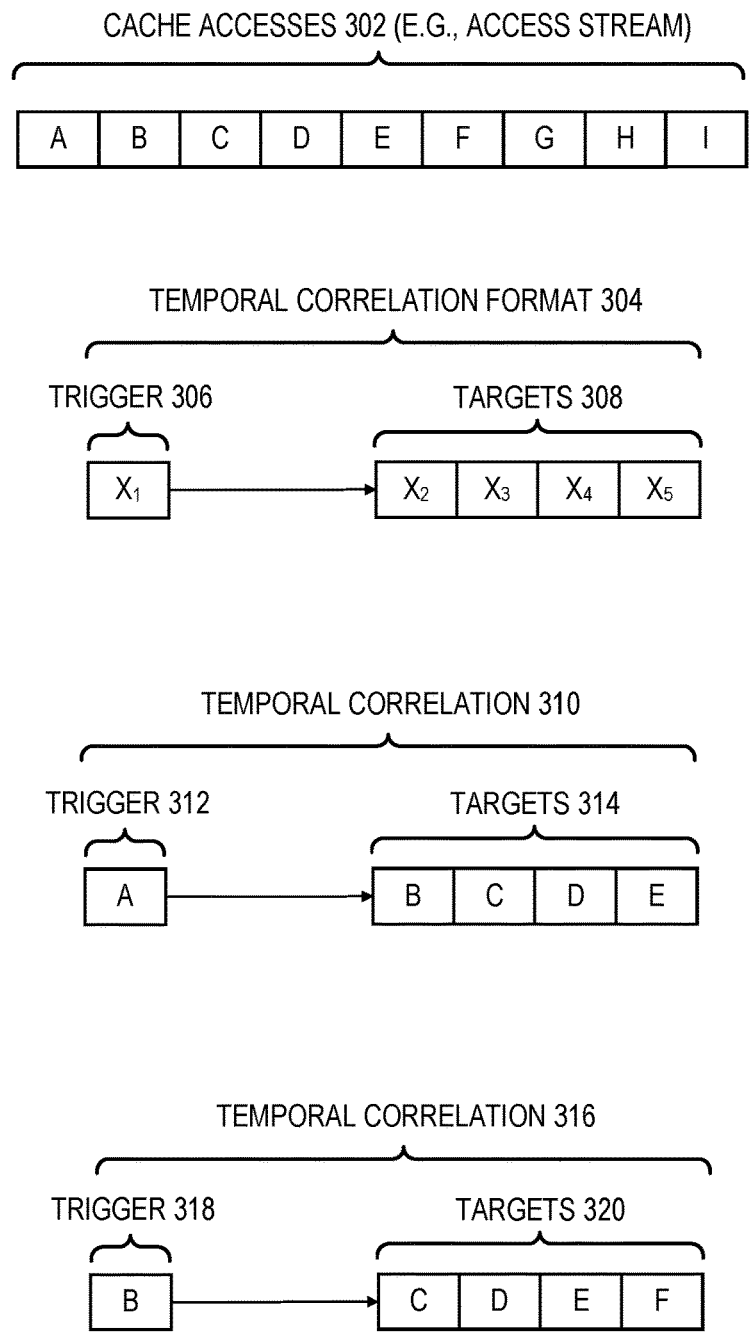
FIG. 3 illustrates a plurality of temporal correlations generated from an access stream according to embodiments of the disclosure.

FIG. 3 illustrates a plurality of temporal correlations (310, 316) generated from an access stream 302 according to embodiments of the disclosure. In certain embodiments, each temporal correlation has a format 304 of a trigger cache line 306 and a plurality of target cache lines 308 that follow the trigger cache line (e.g., in program order).

Assuming the access stream 302 (e.g., cache accesses) that is observed is A B C D E F G H I and if all addresses belonging to the access stream 302 belong to the same reuse window (e.g., bucket), multiple temporal correlations may be generated as shown with temporal correlation 310 having a trigger 312 of "A" and targets 314 of B C D E and temporal correlation 316 having a trigger 318 of "B" and targets 320 of C D E F. However, the B to C, D, E correlation has been stored twice. Since A is the first address, it can and should be used as a trigger event in one embodiment. However, once A is selected as a trigger, selecting B leads to duplication. This redundancy in the information reduces to 0 if picking the target that is farthest to the trigger without fitting in the temporal correlation (e.g., F does not fit in the elements of temporal correlation 310, so F may be used as trigger 318 and G, H, I the targets 320). Certain embodiments herein use this to reduce duplication of temporal correlations.

Figure 4:
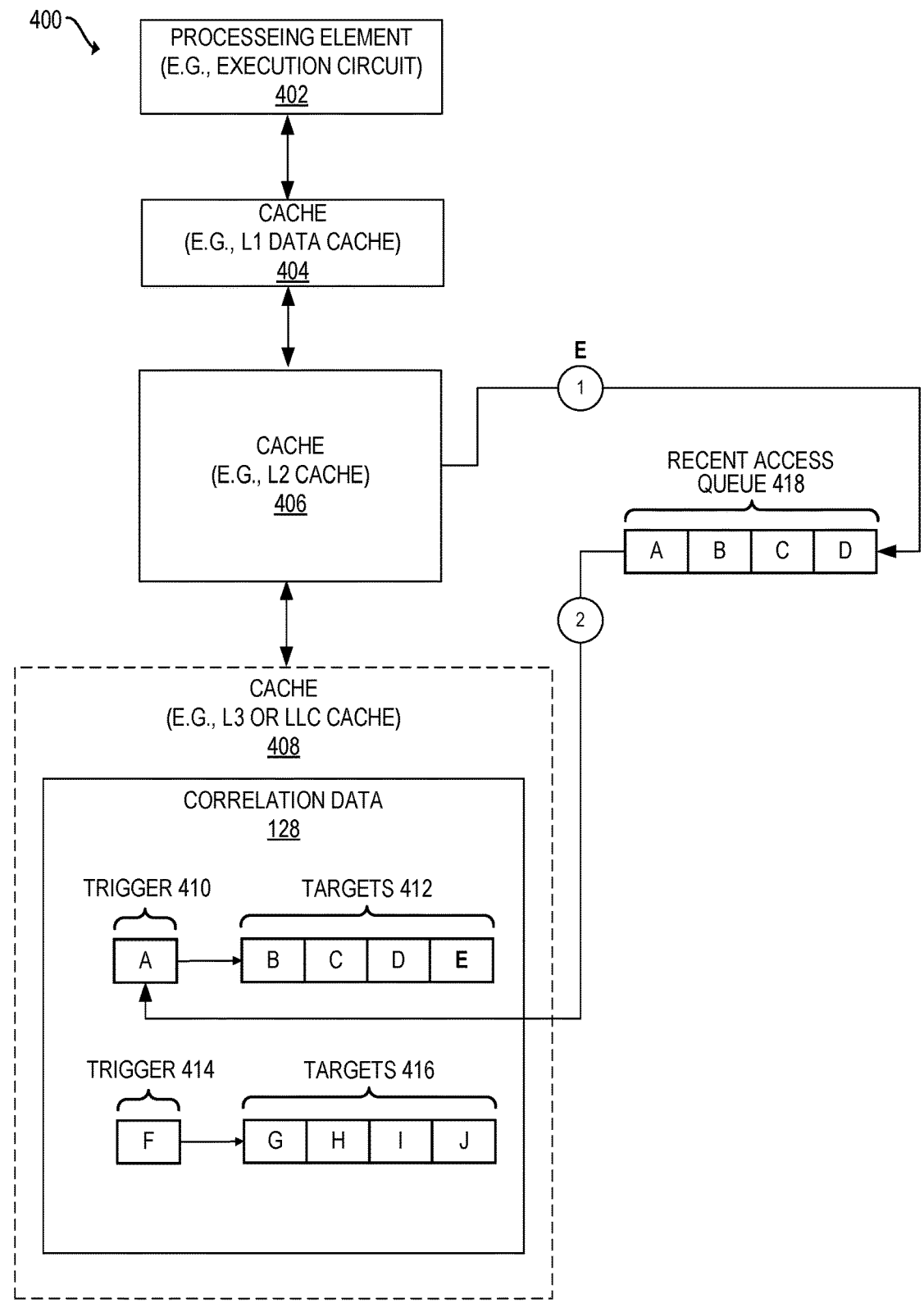
FIG. 4 illustrates learning of correlation data according to embodiments of the disclosure.
Figure 5:
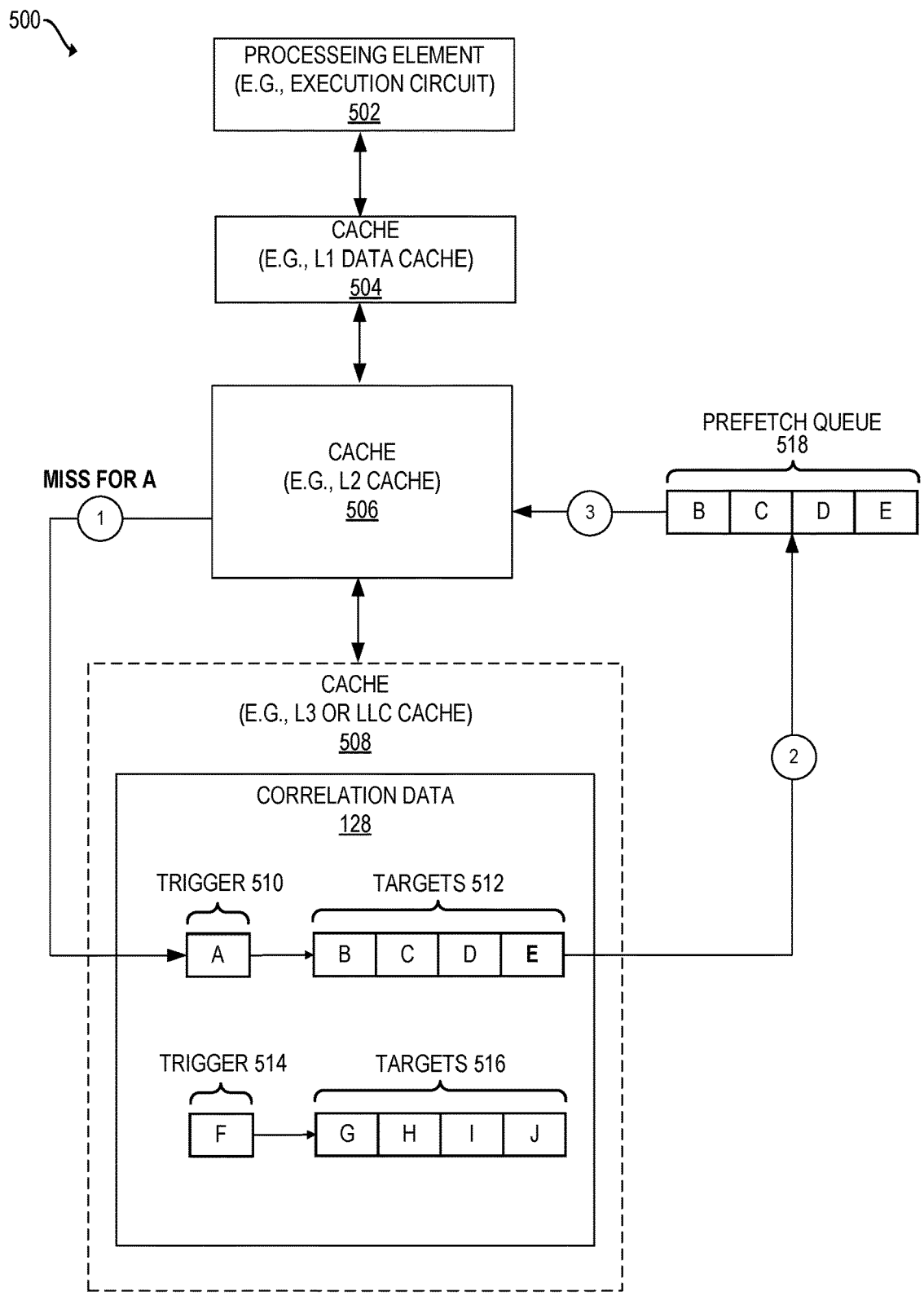
FIG. 5 illustrates prediction using correlation data according to embodiments of the disclosure.

FIGS. 4 and 5 show a flow for two fundamental operations: (1) learning and storing temporal correlations in the correlation data storage, and (2) predicting future accesses based on a trigger event.

FIG. 4 illustrates (e.g., system 400 for) learning of (e.g., temporal) correlation data 128 according to embodiments of the disclosure. In FIG. 4, a processing element (e.g., execution circuit) 402 generates a memory (e.g., read) request (e.g., for a particular physical address and/or cache line of data). Processing element 402 may be a core in FIG. 1, or any other processing element. As one example, the memory request for cache line "E" misses (e.g., is not cached therein) in cache 404 (e.g., L1 data cache), and is thus sent to cache 406 (e.g., L2 cache) to be searched for. In the depicted embodiment, the memory request for "E" hits (e.g., is already cached) or misses (e.g., is not already cached) against a prefetched cache line within cache 406 (e.g., L2 cache) at circle (1). In FIG. 4, previous misses and/or prefetch hits in cache 406 are recorded in request access (e.g., address) queue 418 (shown as populated with A, B, C, D). In the depicted embodiment, recent access queue 418 (shown as A, B, C, D) is full and, assuming the temporal correlation format 304 form FIG. 3 is used for a trigger 306 and four targets 308, the access for E in cache 406 is to cause the population of a corresponding correlation entry in correlation data 128 (e.g., in cache 408, separate from cache 404 and cache 406) to be updated at circle (2) (e.g., assuming that no existing entry exists for that trigger address of A), that is, with trigger 410 of that entry being updated with an A and the targets 412 of that entry being updated with B, C, D, E. Correlation data 128 may include multiple entries, e.g., one for each temporal window value (e.g., one for a 10M instructions executed window, one for a 100M instructions executed window, etc.) In FIG. 4, second entry in correlation data 128 includes a second entry having trigger 414 of that entry being F and the targets 416 of that entry being G, H, I, J. A further example of the learning of (e.g., temporal) correlation data is discussed below in reference to FIG. 7.

The number of elements used herein are merely examples, and any single or plurality of elements may be utilized, for example, having any number of targets for a trigger and not limited to having four as illustrated.

FIG. 5 illustrates (e.g., system 500 for) prediction using (e.g., temporal) correlation data 128 according to embodiments of the disclosure. In FIG. 5, a processing element (e.g., execution circuit) 502 generates a memory (e.g., read) request (e.g., for a particular physical address and/or cache line of data). Processing element 502 may be a core in FIG. 1, or any other processing element. As one example, the memory request for cache line "A" misses (e.g., is not cached therein) in cache 504 (e.g., L1 data cache), and is thus sent to cache 506 (e.g., L2 cache) to be searched for. In the depicted embodiment, the memory request for "A" also misses within cache 406 (e.g., L2 cache). At circle (1), the memory request for "A" is sent to correlation data 128, for example, to search for any entry therein having a trigger of A. In FIG. 5, trigger 510 in an entry of correlation data 128 is "A", and thus the data for targets 512 (B, C, D, E) (e.g., and the data for A) is caused to be loaded into cache 506, e.g., with the addresses sent to prefetch queue 518 at circle (2) and then being serviced at circle (3) by having their corresponding data loaded into cache 506. In FIG. 5, second entry in correlation data 128 includes a second entry having trigger 514 of that entry being F and the targets 516 of that entry being G, H, I, J. A further example of prediction using (e.g., temporal) correlation data is discussed below in reference to FIG. 8.

Figure 6:
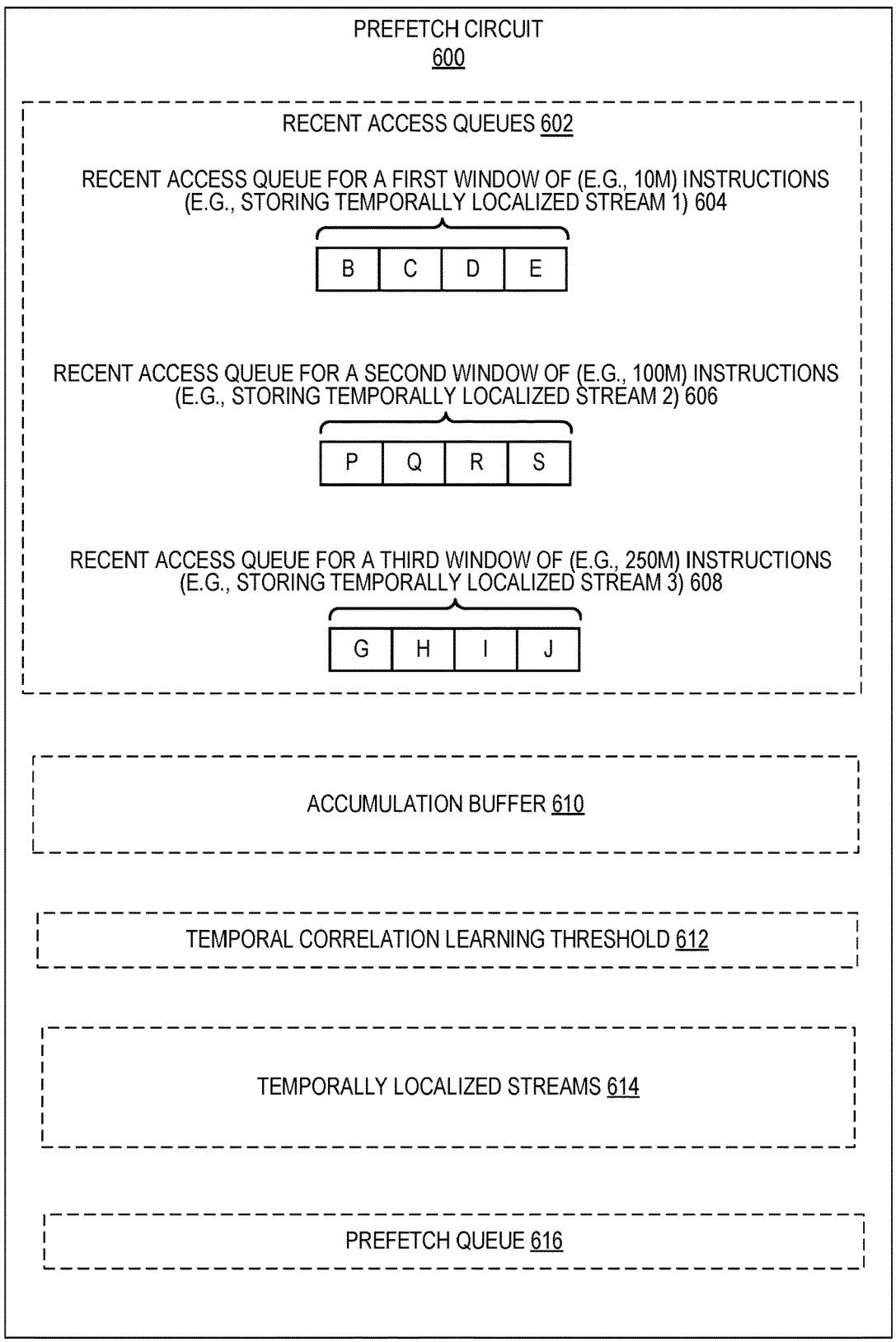
FIG. 6 illustrates a prefetch circuit according to embodiments of the disclosure.

FIG. 6 illustrates a prefetch circuit 600 according to embodiments of the disclosure. Prefetch circuit 600 may include one or any combination of the depicted components, e.g., in addition to prefetch circuit 600 performing the prefetching of data (e.g., from memory 124 in FIG. 1 into one or more of the caches). Depicted prefetch circuit 600 includes a plurality of recent access queues 602, e.g., to store entries indicating recent address requests (e.g., in the order received) for a particular cache (e.g., for requests that hit in L2 but missed in L1). A single or any plurality of recent access queues may be utilized, e.g., one for each temporal window being tracked (e.g., 602 604, 606 for first window, second window, and third window, respectively). In certain embodiments, prefetcher circuit 600 is to update a particular recent access queue based on which temporal window the cache line belongs to (e.g., as indicated by the temporally localized streams 614). Accumulation buffer 610 may be included to decide prefetch granularity, e.g., as discussed in reference to FIG. 9. Temporal correlation learning threshold 612 may be includes to store a value that indicates when to perform a training operation for a memory request (e.g., a L2 hit after a L1 miss). Temporally localized streams 614 (e.g., bloom filters) may store one or more temporally localized streams, e.g., as discussed in reference to FIG. 2. Prefetch queue 616 may be included as an instance of prefetch queue 518 in FIG. 5, e.g., to store cache line addresses as their data is fetched and stored into the indicated cache. Prefetcher circuit may be prefetch circuit 1178.

A prefetcher (e.g., prefetch circuit) may perform operations for the learning of (e.g., temporal) correlation data. The learning may be triggered on (e.g., L2) cache accesses that are prefetch-hits or cache misses to create and store temporal correlations. In certain embodiments, a prefetcher only considers accesses emanating from instructions that have low (e.g., L2) cache hit rates (for example, the number of hits for a particular instruction (e.g., that caused the cache access) divided by the number of accesses to that cache). In certain embodiments, the prefetcher appends the access to the recent accesses queue (RAQ) values for that particular reuse window (e.g., bucket). In one embodiment, when the RAQ is full, the prefetcher determines if the oldest access in the RAQ can be used as a trigger-event for younger accesses, e.g., and does not create a correlation if most younger accesses incurred a prefetch hit because such a condition indicates that this stream already enjoys acceptable coverage and otherwise creates a correlation between the accesses. In one embodiment, if the newly created temporal correlation has a higher priority than a previously stored correlation (e.g., its number of executed instructions (window) is larger than the number of executed instructions for another entry in the correlation data), the prefetcher stores the correlation in the correlation data (e.g., in the LLC), e.g., and removes the accesses from the RAQ.

Figure 7:
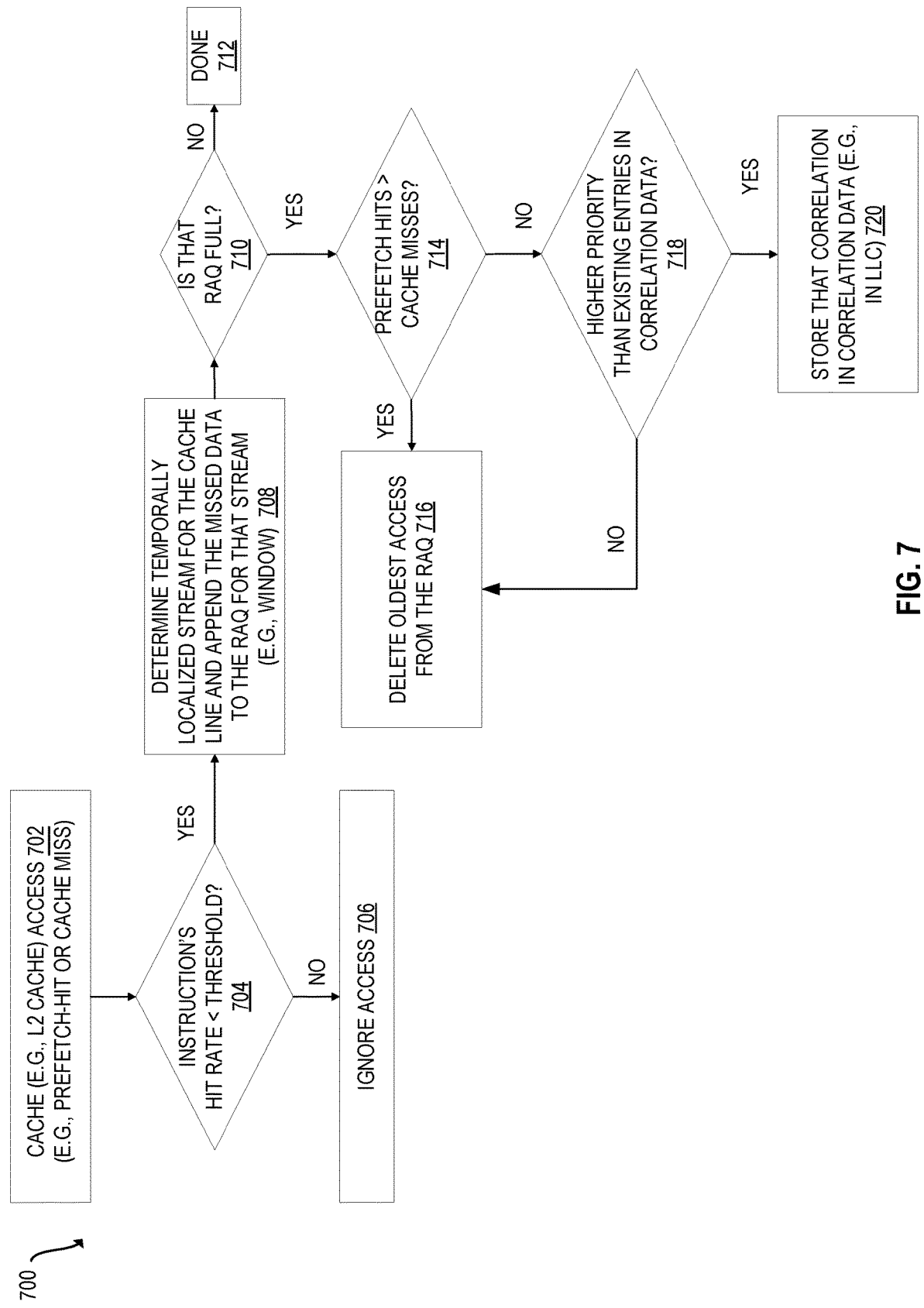
FIG. 7 illustrates example operations for the learning of correlation data according to embodiments of the disclosure.

FIG. 7 illustrates example operations 700 for the learning of (e.g., temporal) correlation data according to embodiments of the disclosure. Operations may be performed by a prefetcher. Operations 700 include receiving a cache access at 702 (e.g., an L2 cache access after an L1 miss) for a cache line, and determining if the instruction that caused the cache access has a hit rate less than a threshold (e.g., about 40%) at 704, and, if no at 704, ignoring the access at 706 (e.g., not using the cache access to train the prefetcher), and if yes at 704, determining a temporally localized stream of a plurality of temporally localized streams for the cache line (e.g., one of the streams as discussed in reference to FIG. 2) and append the missed data to the RAQ (e.g., one of the RAQs 602 in FIG. 6) for that particular stream (e.g., particular window) at 708. In FIG. 7, that RAQ is checked if it is full at 710, and if no at 710, the operations are complete for this cache access at 712, and if yes at 710, the number of prefetch hits is checked if it is greater than the number of cache misses at 714, and if yes, deleting the oldest access from the RAQ at 716 (for example, based on its age, e.g., removing the first entry in the RAQ if the RAQ is implemented as a first-in, first-out (FIFO) buffer), and if no at 710, checking if the correlation is higher priority than existing correlations stored in the correlation data at 718, and if no at 718, deleting the oldest access from the RAQ at 716, and if yes at 718, replacing the lower (e.g., lowest) priority correlation in correlation data with the new correlation at 720. In one embodiment, a correlation from a smaller window has a higher priority, e.g., a prefetcher would replace a correlation from a 100M window or 250M window with a correlation from a 10M window, using the example numbers from FIG. 2. Thus, certain embodiments herein allow only a single RAQ of a plurality of RAQs to be updated based on the corresponding window that the current cache access is found in, e.g., instead of using every recent access to populate a single RAQ.

In certain embodiments, each entry in a RAQ describes a cache access, and the prefetcher has (e.g., tracks) two facts regarding each access: (1) its address and (2) did it miss in the cache or did it hit against a prefetched line. In one embodiment, if, for a particular cache sequence, there are more prefetch hits than cache misses, the comparison at 714 indicates that the stream enjoys good coverage (e.g., the prefetcher is aware of this sequence and issuing prefetches for it), for example, to avoid storing a new temporal correlation for a cache sequence that already enjoys good prefetch coverage.

A prefetcher (e.g., prefetch circuit) may perform prediction operations using (e.g., temporal) correlation data. In one embodiment, for all cache misses (e.g., in a certain cache), a prefetcher checks if the access' address is a trigger-address of a previously stored correlation, e.g., and if yes, the prefetcher causes the data indicated by that correlation to be prefetched into the cache (for example, via adding a meta-data read packet identifying the data from the correlation into the cache's read queue (e.g., if that queue is not full) to cause the data to be prefetched into the cache).

Figure 8:
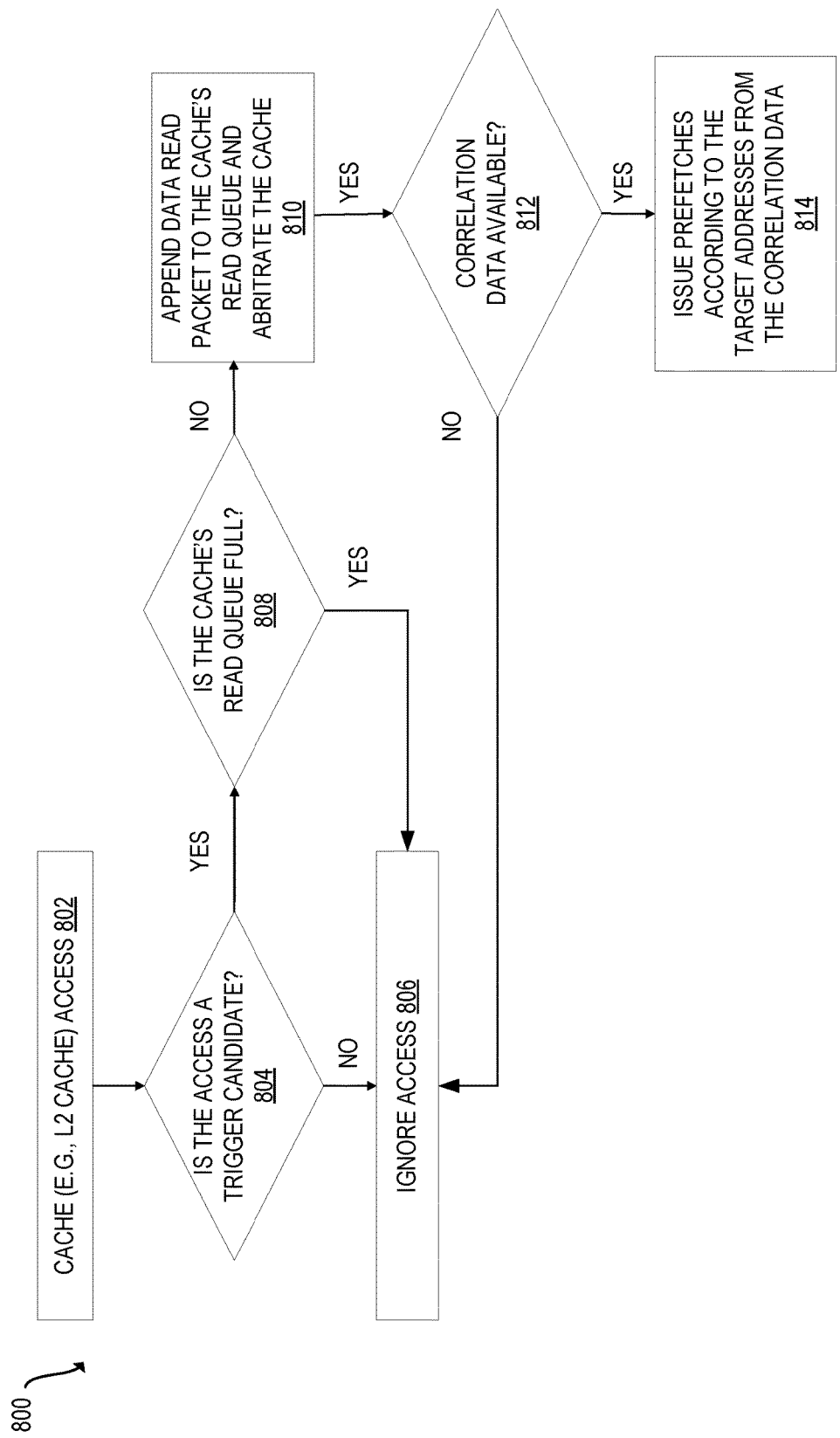
FIG. 8 illustrates example operations for prediction using correlation data according to embodiments of the disclosure.

FIG. 8 illustrates example operations 800 for prediction using (e.g., temporal) correlation data according to embodiments of the disclosure. Operations may be performed by a prefetcher. Operations 800 include receiving a cache access at 802 (e.g., an L2 cache miss after an L1 miss) for a cache line, and checking the correlation data with the address for the cache access for a match with a trigger in any of the entries in the correlation data at 804, and if no at 804, ignoring that access at 806 (e.g., not causing a prefetch based on that cache access), and if yes at 804, checking if the (e.g., LLC) cache's read queue is full at 808, and if yes at 808, ignoring that access at 806 (e.g., not causing a prefetch based on that cache access), and if no at 808, appending a data read packet for the cache (e.g., into the cache's read queue), e.g., and arbitrating the cache, at 810, and then checking if correlation data is available (e.g., from the LLC) at 812, and if no at 812, ignoring that access at 806 (e.g., not causing a prefetch based on that cache access), and if yes at 812, issuing the prefetches for that data according to the addresses from the correlation data at 814.

The above discusses determining correlations on a cache line (e.g., address) by cache line (e.g., address) granularity. However, certain embodiments herein may have a different (e.g., coarser) granularity, for example, a page of memory by page of memory granularity. A prefetcher may exploit long-range spatial locality. Even with de-duplicating temporal correlations, there may be certain workloads whose data footprint is too large to be stored in the form of cache line to cache line correlations. Certain prefetchers herein can learn such patterns even when the accesses are spread over long execution windows (e.g., 10M-15M instructions or even greater than 100M instructions). In one embodiment, temporal correlations are stored between pages instead of between (e.g., physical) addresses of cache lines, e.g., at 4 KB granularity.

Figure 9:
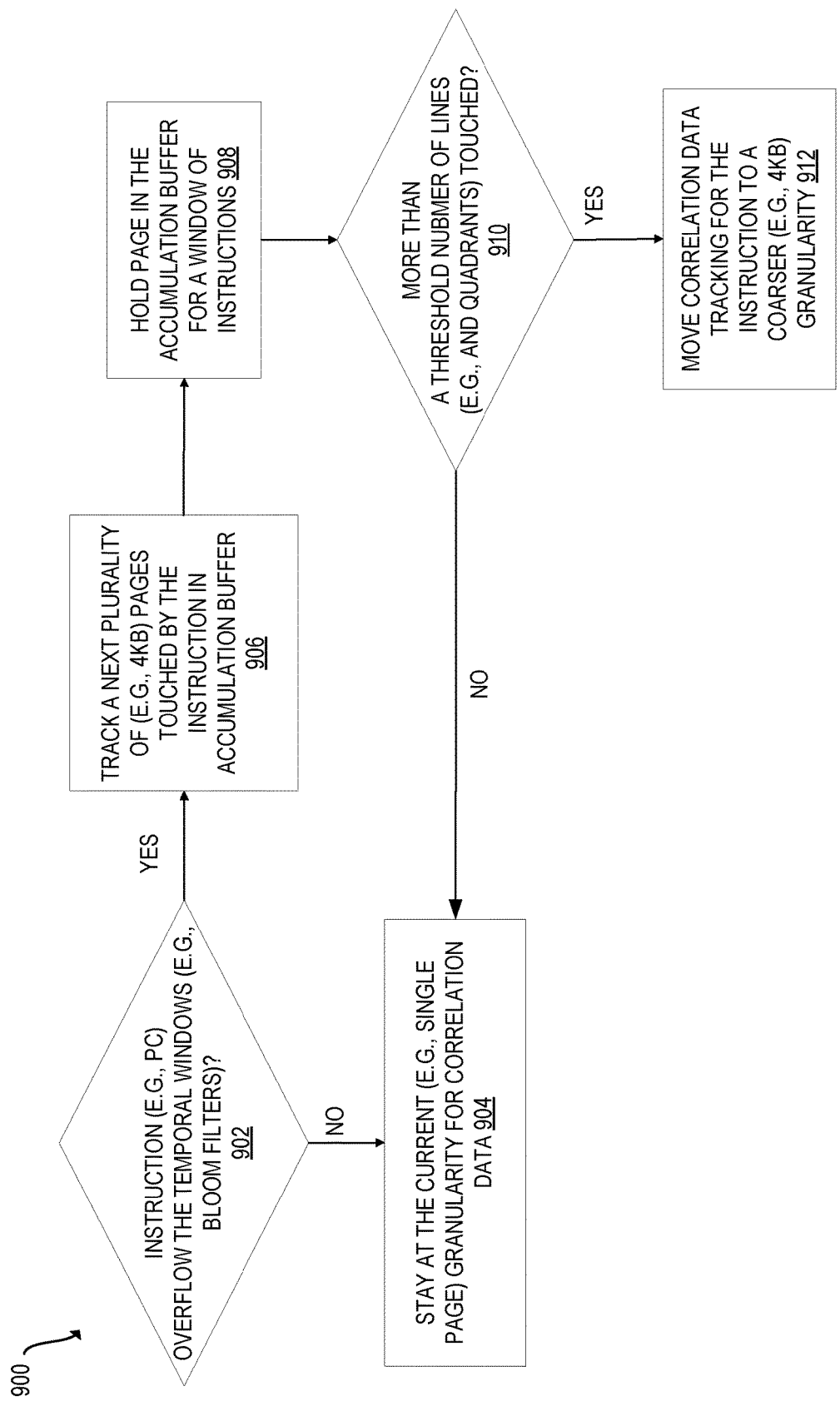
FIG. 9 illustrates example operations for deciding the granularity for correlation data according to embodiments of the disclosure.

FIG. 9 illustrates example operations 900 for deciding the granularity for (e.g., temporal) correlation data according to embodiments of the disclosure. Operations may be performed by a prefetcher. In one embodiment, a prefetcher tracks accesses to four temporal streams: (1) pages reused in a (e.g., 10M) execution window, (2) cache lines reused in the (e.g., 10M) execution window, (c) pages not observed in last (e.g., 10M) execution window, and (d) cache lines not observed in last (e.g., 10M) execution window, for example, with the prefetcher maintaining two bloom filters (e.g., of 16K bits) and one RAQ (e.g., of 16 entries) for each of these temporal streams.

Certain embodiments herein identify long-range spatial locality in instructions that have a large data-footprint. In one embodiment, a prefetcher first isolates instructions that are flooding the cache, and tracks the next plurality of (e.g., 16) pages touched by such instructions. If over the next (e.g., 10M) instruction execution window, the instruction touches more than a threshold (e.g., 50%) of the lines and multiple (e.g., 2) quadrants of the page, the prefetcher tracks accesses of such instructions at page (e.g., 4 KB) granularity in certain embodiments.

Operations 900 include checking if an instruction (e.g., identified via its instruction pointer (program counter)) overflows the temporal windows (e.g., bloom filters) at 902, and if no at 902, staying at the current (e.g., cache line by cache line) granularity for correlation data at 904, if yes at 902, tracking a next plurality of (e.g., 4 KB) pages touched by the instructions in an accumulation buffer (e.g., accumulation buffer 610 in FIG. 6) at 906, and then holding the page in the accumulation buffer for a window of (e.g., 10M) instructions at 908, and then checking if more than a threshold number of lines (e.g., and quadrants) at 910, and if no at 910, staying at the current (e.g., cache line by cache line) granularity for correlation data at 904, and if yes at 910, moving the correlation data tracking for that instruction to a coarser (e.g., page) granularity at 912.

FIG. 10 illustrates a method 1000 of updating first correlation data and second correlation according to embodiments of the disclosure. Method 1000 includes tracking a first set of cache lines, requested to be accessed by memory requests generated from execution of instructions by a hardware processor, that repeat in a first number of executed instructions with a prefetch circuit of a system comprising the hardware processor 1002, tracking a second set of cache lines, requested to be accessed by the memory requests, that repeat in a second, larger number of executed instructions with the prefetch circuit 1004, detecting a memory request from an instruction for a cache line from a cache of the hardware processor by the prefetch circuit 1006, determining if the cache line is within the first set of cache lines or the second set of cache lines by the prefetch circuit 1008, updating first correlation data for the cache line when the cache line is within the first set of cache lines by the prefetch circuit 1010, and updating second correlation data for the cache line when the cache line is within the second set of cache lines by the prefetch circuit 1012.

In certain embodiments, a prefetcher detects a memory read request for an instruction (I) for an address (A) that has a recency window (e.g., bucket) (R), the prefetcher (e.g., after determining if instruction (I) is tracked at page or cache-line granularity) then determines the recency window (e.g., bucket) for address A, and updates the corresponding recent access queue for that recency window.

Exemplary architectures, systems, etc. that the above may be used in are detailed below.

At least some embodiments of the disclosed technologies can be described in view of the following examples:

Example 1. A hardware processor comprising:
    a cache to store a plurality of cache lines of data;
    a processing element to execute instructions to generate memory requests; and
    a prefetch circuit to:
        track a first set of cache lines, requested to be accessed by the memory requests, that repeat in a first number of executed instructions,
        track a second set of cache lines, requested to be accessed by the memory requests, that repeat in a second, larger number of executed instructions,
        detect a memory request from an instruction for a cache line from the cache,
        determine if the cache line is within the first set of cache lines or the second set of cache lines,
        update first correlation data for the cache line when the cache line is within the first set of cache lines, and
        update second correlation data for the cache line when the cache line is within the second set of cache lines.

Example 2. The hardware processor of example 1, wherein the first correlation data identifies a first trigger cache line and a first plurality of target cache lines of data and the second correlation data identifies a second trigger cache line and a second plurality of target cache lines of data.

Example 3. The hardware processor of example 1, wherein the prefetch circuit is to update the first correlation data and the second correlation data only when the instruction has executed a plurality of times and a corresponding hit rate for the instruction in the cache is less than a threshold value.

Example 4. The hardware processor of example 1, wherein the prefetch circuit is to update the first correlation data only when a first recent access queue is full, and then clear the first recent access queue.

Example 5. The hardware processor of example 1, wherein the prefetch circuit is to replace an entry for previous correlation data with the first correlation data when the first number of executed instructions for the first correlation data is greater than a number of executed instructions corresponding to the previous correlation data.

Example 6. The hardware processor of example 1, wherein the prefetch circuit is to, for a miss in the cache for a second cache line, search the first correlation data and the second correlation data for a match of the second cache line, and, for the match in the first correlation data, causing a prefetch of cache lines corresponding to the first correlation data.

Example 7. The hardware processor of example 6, wherein the cache lines corresponding to the first correlation data comprise a first trigger cache line, that matches the second cache line, and a first plurality of target cache lines of data.

Example 8. The hardware processor of example 1, wherein the prefetch circuit stores the first correlation data and the second correlation data in a last level cache of the hardware processor.

Example 9. A method comprising:
    tracking a first set of cache lines, requested to be accessed by memory requests generated from execution of instructions by a hardware processor, that repeat in a first number of executed instructions with a prefetch circuit of a system comprising the hardware processor;
    tracking a second set of cache lines, requested to be accessed by the memory requests, that repeat in a second, larger number of executed instructions with the prefetch circuit;
    detecting a memory request from an instruction for a cache line from a cache of the hardware processor by the prefetch circuit;
    determining if the cache line is within the first set of cache lines or the second set of cache lines by the prefetch circuit;
    updating first correlation data for the cache line when the cache line is within the first set of cache lines by the prefetch circuit; and
    updating second correlation data for the cache line when the cache line is within the second set of cache lines by the prefetch circuit.

Example 10. The method of example 9, wherein the first correlation data identifies a first trigger cache line and a first plurality of target cache lines of data and the second correlation data identifies a second trigger cache line and a second plurality of target cache lines of data.

Example 11. The method of example 9, wherein the updating of the first correlation data and the second correlation data is only when the instruction has executed a plurality of times and a corresponding hit rate for the instruction in the cache is less than a threshold value.

Example 12. The method of example 9, wherein the updating of the first correlation data is only when a first recent access queue is full, and the method further comprises clearing the first recent access queue after the updating of the first correlation data.

Example 13. The method of example 9, further comprising replacing, by the prefetch circuit, an entry for previous correlation data with the first correlation data when the first number of executed instructions for the first correlation data is greater than a number of executed instructions corresponding to the previous correlation data.

Example 14. The method of example 9, further comprising:
    detecting a miss in the cache for a second cache line;
    searching the first correlation data and the second correlation data for a match of the second cache line; and,
    causing, for the match in the first correlation data, a prefetch of cache lines corresponding to the first correlation data.

Example 15. The method of example 14, wherein the cache lines corresponding to the first correlation data comprise a first trigger cache line, that matches the second cache line, and a first plurality of target cache lines of data.

Example 16. The method of example 9, further comprising storing, by the prefetch circuit, the first correlation data and the second correlation data in a last level cache of the system.

Example 17. A non-transitory machine readable medium that stores code that when executed by
  a machine causes the machine to perform a method comprising:
   tracking a first set of cache lines, requested to be accessed by memory requests generated from execution of instructions by a hardware processor, that repeat in a first number of executed instructions with a prefetch circuit of a system comprising the hardware processor;
   tracking a second set of cache lines, requested to be accessed by the memory requests, that repeat in a second, larger number of executed instructions with the prefetch circuit;
   detecting a memory request from an instruction for a cache line from a cache of the hardware processor by the prefetch circuit;
   determining if the cache line is within the first set of cache lines or the second set of cache lines by the prefetch circuit;
   updating first correlation data for the cache line when the cache line is within the first set of cache lines by the prefetch circuit; and
   updating second correlation data for the cache line when the cache line is within the second set of cache lines by the prefetch circuit.

Example 18. The non-transitory machine readable medium of example 17, wherein the first correlation data identifies a first trigger cache line and a first plurality of target cache lines of data and the second correlation data identifies a second trigger cache line and a second plurality of target cache lines of data.

Example 19. The non-transitory machine readable medium of example 17, wherein the updating of the first correlation data and the second correlation data is only when the instruction has executed a plurality of times and a corresponding hit rate for the instruction in the cache is less than a threshold value.

Example 20. The non-transitory machine readable medium of example 17, wherein the updating of the first correlation data is only when a first recent access queue is full, and the non-transitory machine readable medium further comprises clearing the first recent access queue after the updating of the first correlation data.

Example 21. The non-transitory machine readable medium of example 17, wherein the method further comprises replacing, by the prefetch circuit, an entry for previous correlation data with the first correlation data when the first number of executed instructions for the first correlation data is greater than a number of executed instructions corresponding to the previous correlation data.

Example 22. The non-transitory machine readable medium of example 17, wherein the method further comprises:
  detecting a miss in the cache for a second cache line;
  searching the first correlation data and the second correlation data for a match of the second cache line; and,
  causing, for the match in the first correlation data, a prefetch of cache lines corresponding to the first correlation data.

Example 23. The non-transitory machine readable medium of example 22, wherein the cache lines corresponding to the first correlation data comprise a first trigger cache line, that matches the second cache line, and a first plurality of target cache lines of data.

Example 24. The non-transitory machine readable medium of example 17, wherein the method further comprises storing, by the prefetch circuit, the first correlation data and the second correlation data in a last level cache of the system.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures, and descriptions of exemplary processors and computer architectures follow.

Exemplary Core Architectures
In-Order and Out-of-Order Core Block Diagram

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macro-instructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

In certain embodiments, a prefetch circuit 1178 is included to prefetch data, for example, to predict access addresses and bring the data for those addresses into a cache or caches (e.g., from memory 1180).

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7)

various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
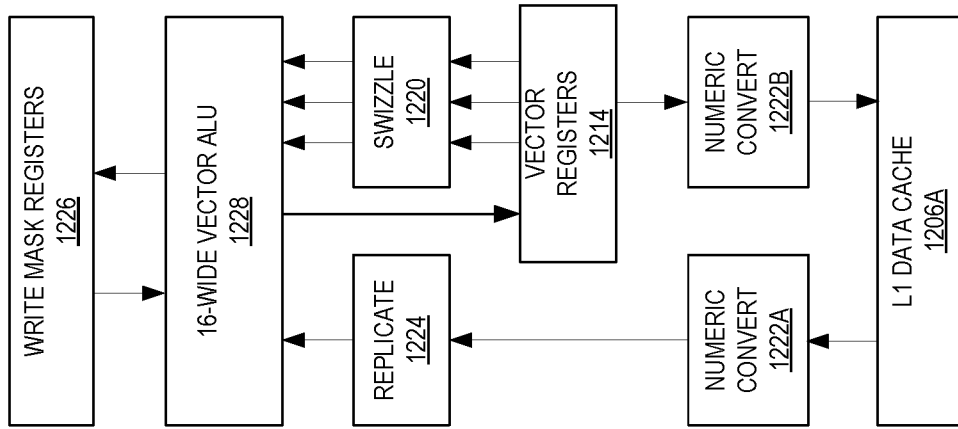
FIG. 12B is an expanded view of part of the processor core in FIG. 12A according to embodiments of the disclosure.
Figure 12A:
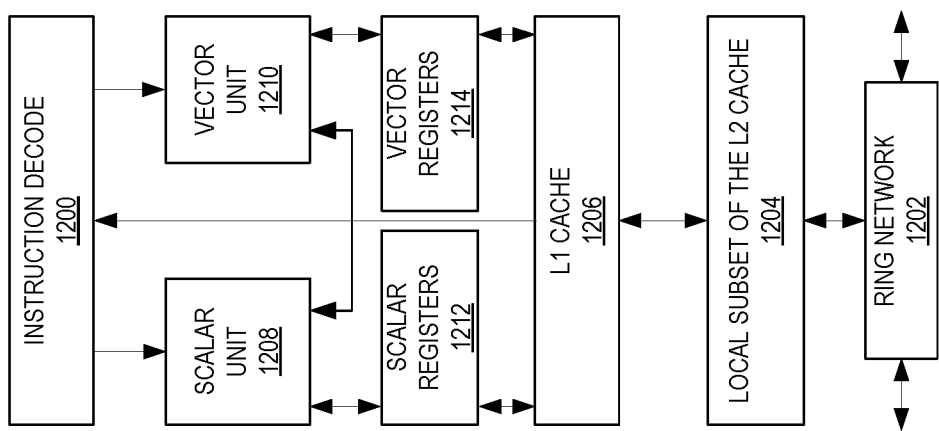
FIG. 12A is a block diagram of a single processor core, along with its connection to the on-die interconnect network and with its local subset of the Level 2 (L2) cache, according to embodiments of the disclosure.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the disclosure. In one embodiment, an instruction decode unit 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
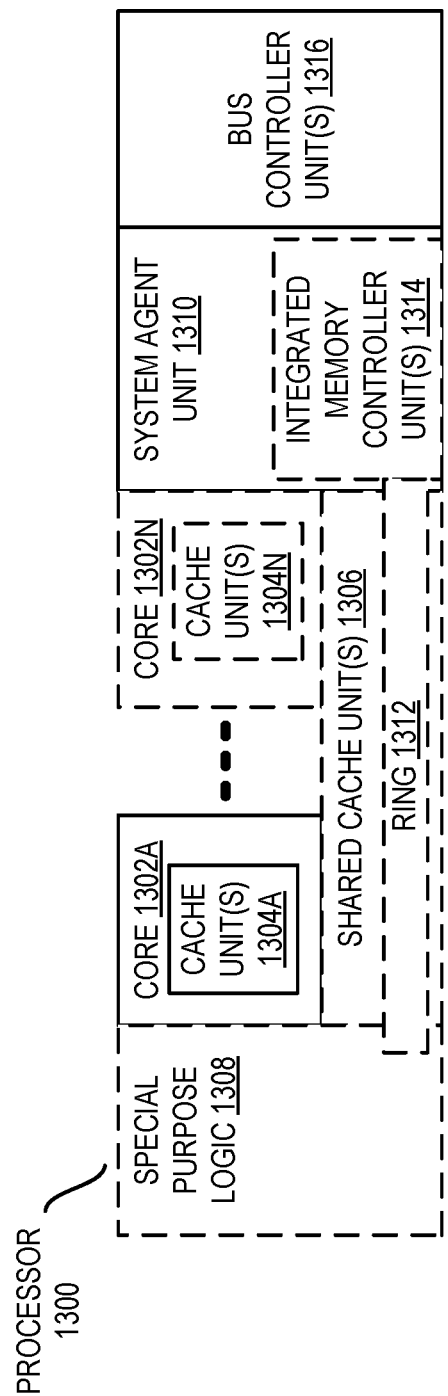
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
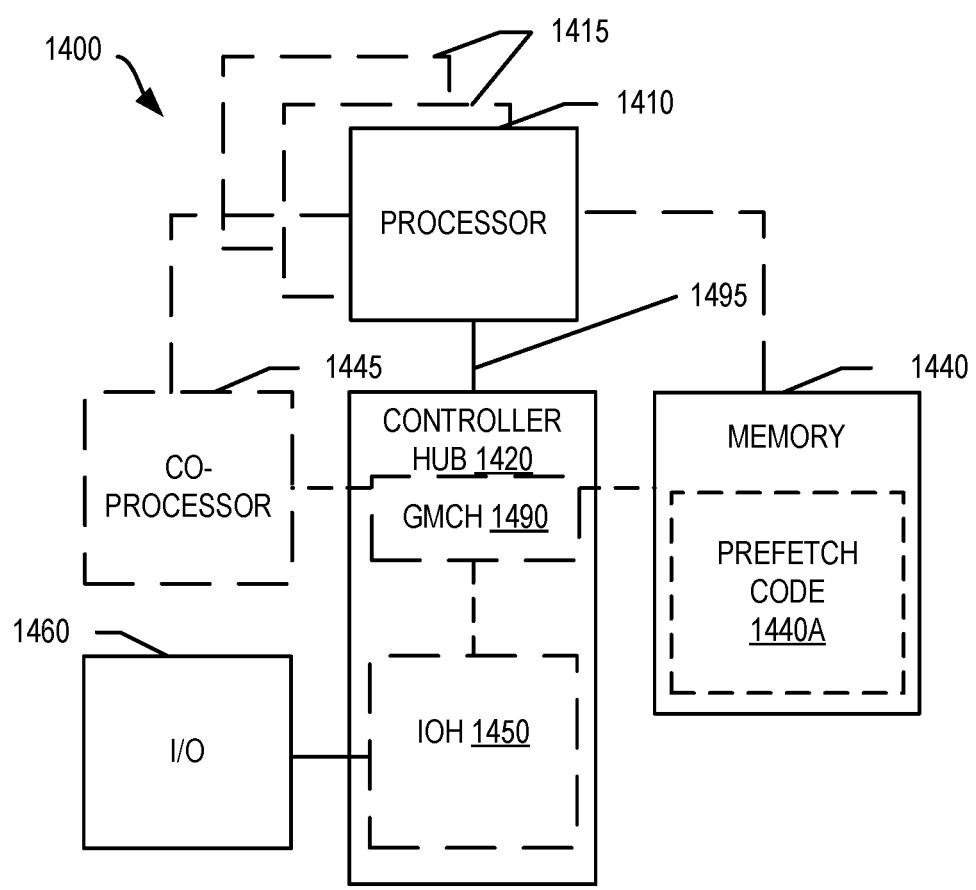
FIG. 14 is a block diagram of a system in accordance with one embodiment of the present disclosure.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450. Memory 1440 may include prefetch code 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as Quickpath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
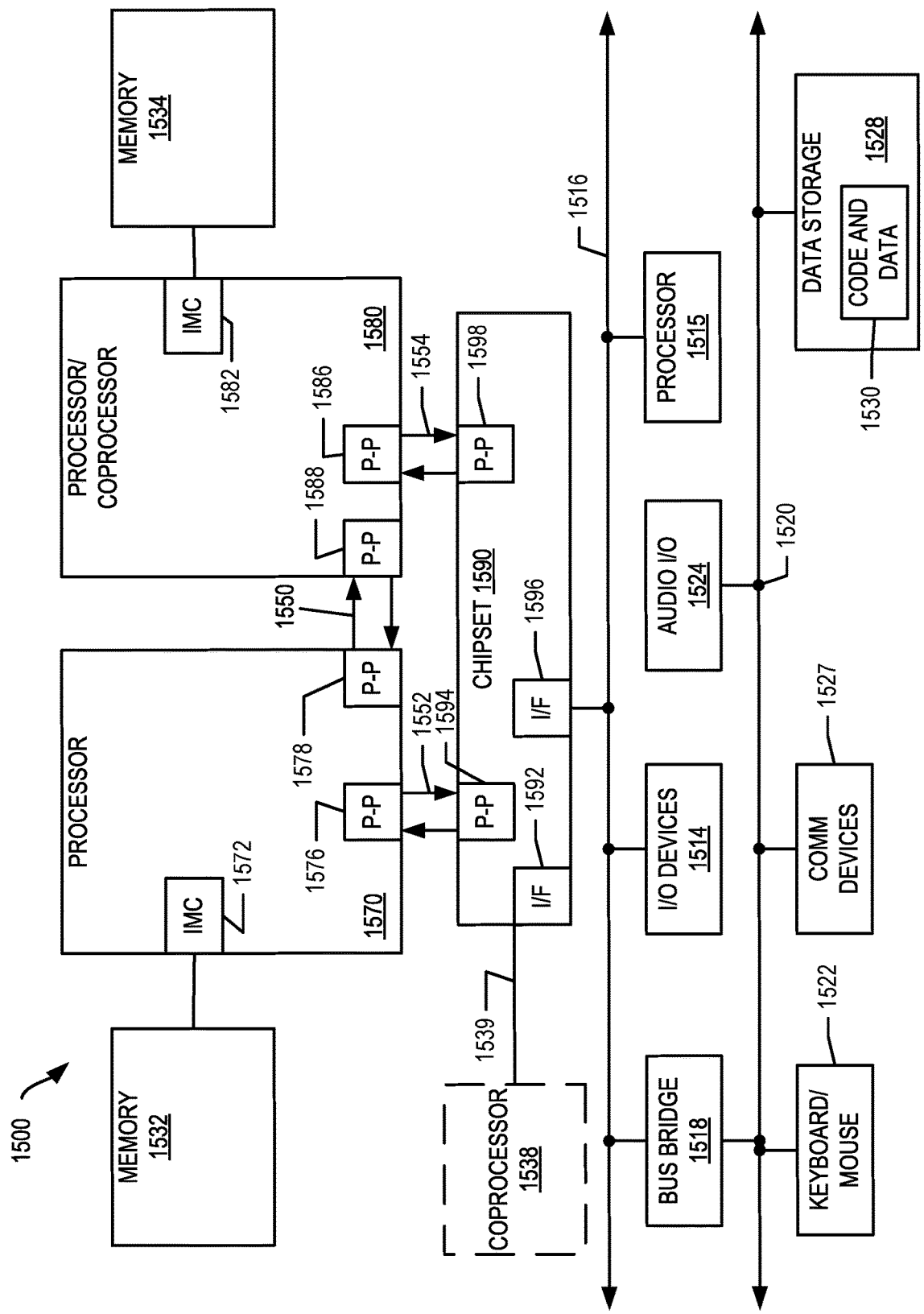
FIG. 15 is a block diagram of a more specific exemplary system in accordance with an embodiment of the present disclosure.

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
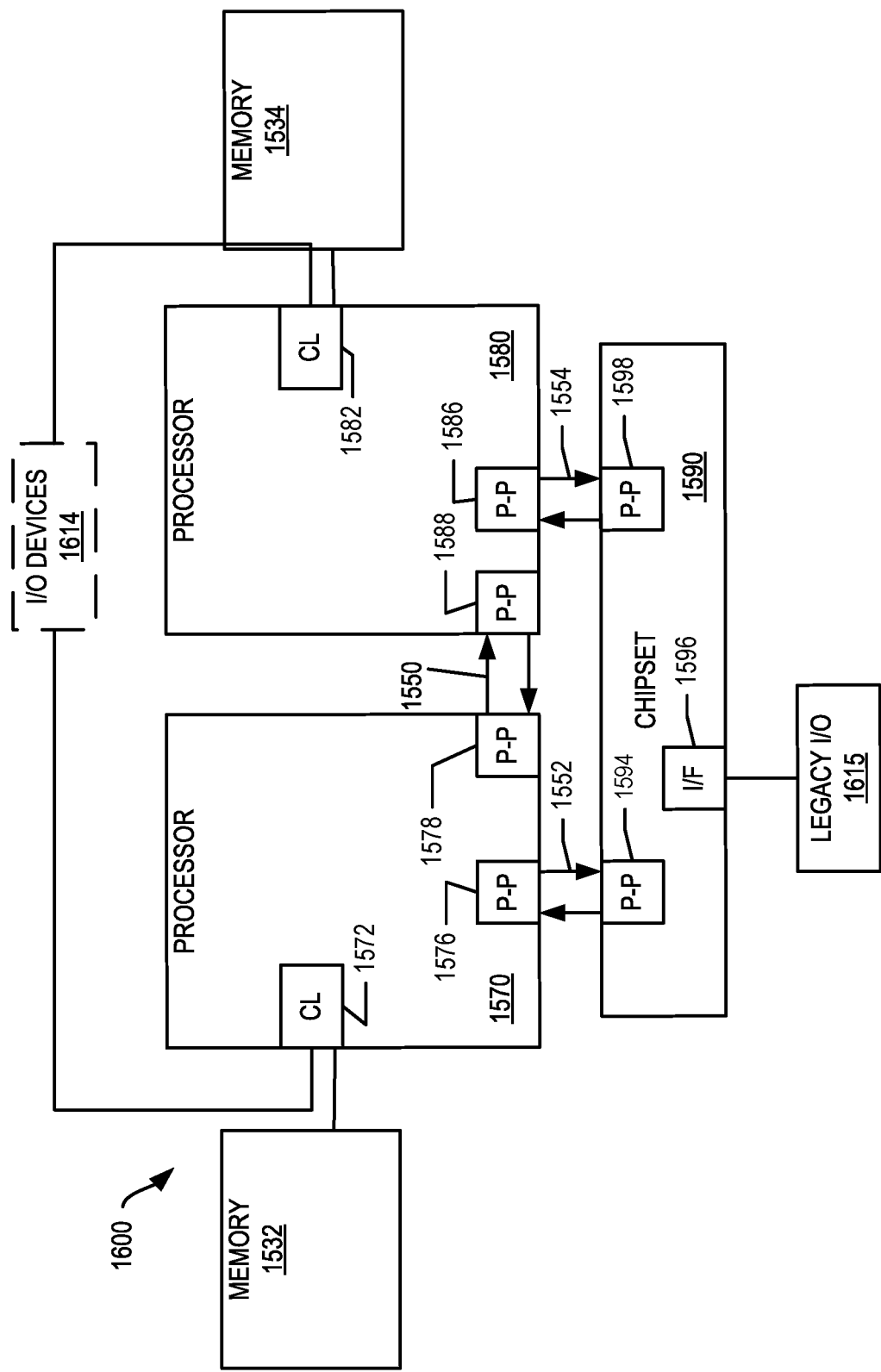
FIG. 16, shown is a block diagram of a second more specific exemplary system in accordance with an embodiment of the present disclosure.

Referring now to FIG. 16, shown is a block diagram of a second more specific exemplary system 1600 in accordance with an embodiment of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
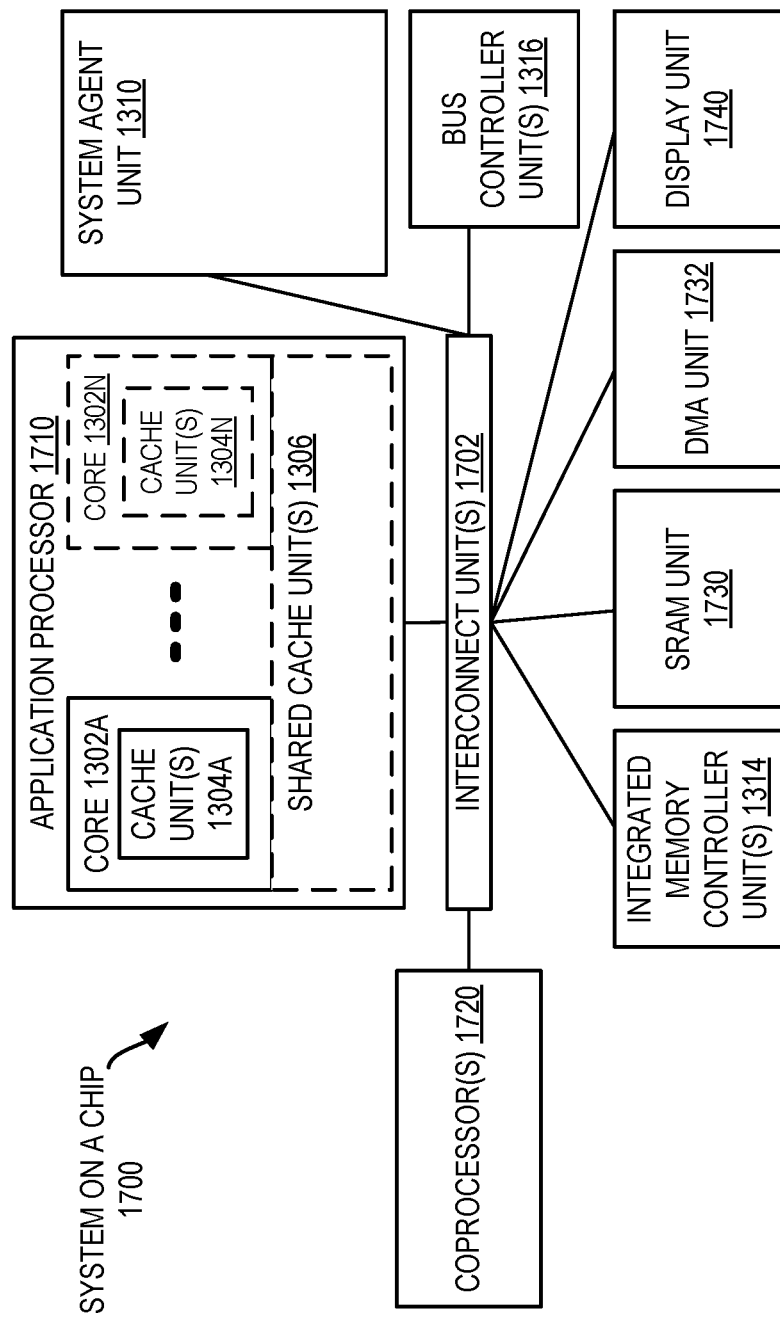
FIG. 17, shown is a block diagram of a system on a chip (SoC) in accordance with an embodiment of the present disclosure.

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
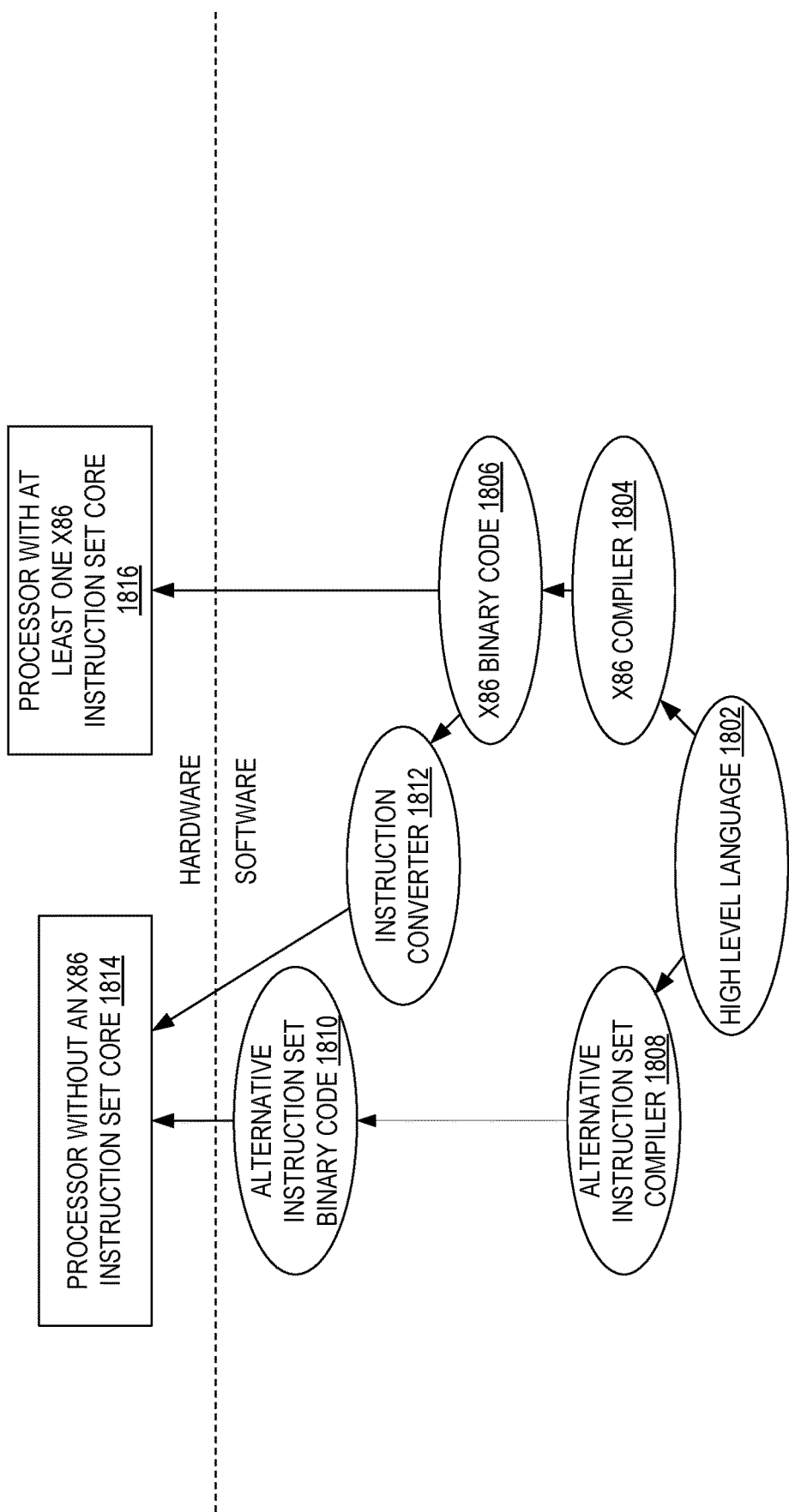
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A hardware processor comprising:
a cache to store a plurality of cache lines of data;
a processing element to execute instructions to generate memory requests; and
a prefetch circuit to:
track a first set of cache lines, requested to be accessed by the memory requests, based on the memory requests repeatedly accessing the first set of cache lines only in a first number of executed instructions,
track a second set of cache lines, requested to be accessed by the memory requests, based on the memory requests repeatedly accessing the second set of cache lines only in a second, larger number of executed instructions,
detect a memory request from an instruction for a cache line from the cache,
determine if the cache line is within the first set of cache lines or the second set of cache lines,
update first correlation data for the cache line when the cache line is within the first set of cache lines, and update second correlation data for the cache line when the cache line is within the second set of cache lines.

2. The hardware processor of claim 1, wherein the first correlation data identifies a first trigger cache line and a first plurality of target cache lines of data and the second correlation data identifies a second trigger cache line and a second plurality of target cache lines of data.

3. The hardware processor of claim 1, wherein the prefetch circuit is to update the first correlation data and the second correlation data only when the instruction has executed a plurality of times and a corresponding hit rate for the instruction in the cache is less than a threshold value.

4. The hardware processor of claim 1, wherein the prefetch circuit is to update the first correlation data only when a first recent access queue is full, and then clear the first recent access queue.

5. The hardware processor of claim 1, wherein the prefetch circuit is to replace an entry for previous correlation data with the first correlation data when the first number of executed instructions for the first correlation data is greater than a number of executed instructions corresponding to the previous correlation data.

6. The hardware processor of claim 1, wherein the prefetch circuit is to, for a miss in the cache for a second cache line, search the first correlation data and the second correlation data for a match of the second cache line, and, for the match in the first correlation data, causing a prefetch of cache lines corresponding to the first correlation data.

7. The hardware processor of claim 6, wherein the cache lines corresponding to the first correlation data comprise a first trigger cache line, that matches the second cache line, and a first plurality of target cache lines of data.

8. The hardware processor of claim 1, wherein the prefetch circuit stores the first correlation data and the second correlation data in a last level cache of the hardware processor.

9. A method comprising:
tracking a first set of cache lines, requested to be accessed by memory requests generated from execution of instructions by a hardware processor, based on the memory requests repeatedly accessing the first set of cache lines only in a first number of executed instructions with a prefetch circuit of a system comprising the hardware processor;
tracking a second set of cache lines, requested to be accessed by the memory requests, based on the memory requests repeatedly accessing the second set of cache lines only in a second, larger number of executed instructions with the prefetch circuit;
detecting a memory request from an instruction for a cache line from a cache of the hardware processor by the prefetch circuit;
determining if the cache line is within the first set of cache lines or the second set of cache lines by the prefetch circuit;
updating first correlation data for the cache line when the cache line is within the first set of cache lines by the prefetch circuit; and
updating second correlation data for the cache line when the cache line is within the second set of cache lines by the prefetch circuit.

10. The method of claim 9, wherein the first correlation data identifies a first trigger cache line and a first plurality of target cache lines of data and the second correlation data identifies a second trigger cache line and a second plurality of target cache lines of data.

11. The method of claim 9, wherein the updating of the first correlation data and the second correlation data is only when the instruction has executed a plurality of times and a corresponding hit rate for the instruction in the cache is less than a threshold value.

12. The method of claim 9, wherein the updating of the first correlation data is only when a first recent access queue is full, and the method further comprises clearing the first recent access queue after the updating of the first correlation data.

13. The method of claim 9, further comprising replacing, by the prefetch circuit, an entry for previous correlation data with the first correlation data when the first number of executed instructions for the first correlation data is greater than a number of executed instructions corresponding to the previous correlation data.

14. The method of claim 9, further comprising:
   detecting a miss in the cache for a second cache line;
   searching the first correlation data and the second correlation data for a match of the second cache line; and,
   causing, for the match in the first correlation data, a prefetch of cache lines corresponding to the first correlation data.

15. The method of claim 14, wherein the cache lines corresponding to the first correlation data comprise a first trigger cache line, that matches the second cache line, and a first plurality of target cache lines of data.

16. The method of claim 9, further comprising storing, by the prefetch circuit, the first correlation data and the second correlation data in a last level cache of the system.

17. A non-transitory machine readable medium that stores code that when executed by a machine causes the machine to perform a method comprising:
   tracking a first set of cache lines, requested to be accessed by memory requests generated from execution of instructions by a hardware processor, based on the memory requests repeatedly accessing the first set of cache lines only in a first number of executed instructions with a prefetch circuit of a system comprising the hardware processor;
   tracking a second set of cache lines, requested to be accessed by the memory requests, based on the memory requests repeatedly accessing the second set of cache lines only in a second, larger number of executed instructions with the prefetch circuit;
   detecting a memory request from an instruction for a cache line from a cache of the hardware processor by the prefetch circuit;
   determining if the cache line is within the first set of cache lines or the second set of cache lines by the prefetch circuit;
   updating first correlation data for the cache line when the cache line is within the first set of cache lines by the prefetch circuit; and
   updating second correlation data for the cache line when the cache line is within the second set of cache lines by the prefetch circuit.

18. The non-transitory machine readable medium of claim 17, wherein the first correlation data identifies a first trigger cache line and a first plurality of target cache lines of data and the second correlation data identifies a second trigger cache line and a second plurality of target cache lines of data.

19. The non-transitory machine readable medium of claim 17, wherein the updating of the first correlation data and the second correlation data is only when the instruction has executed a plurality of times and a corresponding hit rate for the instruction in the cache is less than a threshold value.

20. The non-transitory machine readable medium of claim 17, wherein the updating of the first correlation data is only when a first recent access queue is full, and the non-transitory machine readable medium further comprises clearing the first recent access queue after the updating of the first correlation data.

21. The non-transitory machine readable medium of claim 17, wherein the method further comprises replacing, by the prefetch circuit, an entry for previous correlation data with the first correlation data when the first number of executed instructions for the first correlation data is greater than a number of executed instructions corresponding to the previous correlation data.

22. The non-transitory machine readable medium of claim 17, wherein the method further comprises:
   detecting a miss in the cache for a second cache line;
   searching the first correlation data and the second correlation data for a match of the second cache line; and,
   causing, for the match in the first correlation data, a prefetch of cache lines corresponding to the first correlation data.

23. The non-transitory machine readable medium of claim 22, wherein the cache lines corresponding to the first correlation data comprise a first trigger cache line, that matches the second cache line, and a first plurality of target cache lines of data.

24. The non-transitory machine readable medium of claim 17, wherein the method further comprises storing, by the prefetch circuit, the first correlation data and the second correlation data in a last level cache of the system.

\* \* \* \* \*